(12) United States Patent
Hikawa et al.

(10) Patent No.: US 10,154,160 B2
(45) Date of Patent: Dec. 11, 2018

(54) SYSTEM, PROCESSING DEVICE, AND NON-TRANSITORY COMPUTER READABLE STORAGE MEDIUM FOR STORING AND TRANSMITTING A DATA PART OF A DOCUMENT

(71) Applicant: FUJI XEROX CO., LTD., Tokyo (JP)

(72) Inventors: Yuji Hikawa, Kanagawa (JP); Manabu Hayashi, Kanagawa (JP); Keita Sakakura, Kanagawa (JP); Masafumi Ono, Kanagawa (JP); Hiroyoshi Uejo, Kanagawa (JP); Akira Misumi, Kanagawa (JP); Tomoya Shibata, Kanagawa (JP); Naoya Nobutani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/490,185

(22) Filed: Apr. 18, 2017

(65) Prior Publication Data

US 2018/0034982 A1 Feb. 1, 2018

(30) Foreign Application Priority Data

Jul. 26, 2016 (JP) .................................. 2016-146828
Nov. 15, 2016 (JP) .................................. 2016-222111

(51) Int. Cl.
*G06F 3/12* (2006.01)
*H04N 1/00* (2006.01)

(52) U.S. Cl.
CPC ..... *H04N 1/00212* (2013.01); *H04N 1/00204* (2013.01); *H04N 1/00344* (2013.01); *H04N 1/00347* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2006/0232818 A1* | 10/2006 | Hino | ..................... | G06F 3/1204 358/1.15 |
| 2007/0133882 A1* | 6/2007 | Matsuno | ................ | G06Q 10/10 382/209 |
| 2007/0165268 A1* | 7/2007 | Sodeura | ............. | H04N 1/00209 358/1.15 |
| 2012/0212778 A1* | 8/2012 | Sakai | ................... | G06K 15/402 358/1.15 |

FOREIGN PATENT DOCUMENTS

JP 2007-026110 A 2/2007

* cited by examiner

*Primary Examiner* — Henok A Shiferaw
(74) *Attorney, Agent, or Firm* — Oliff PLC

(57) ABSTRACT

A system includes:
a printing unit that prints a document including a data part;
a storage unit that stores (i) specifying information which uniquely specifies the document and (ii) the data part in association with each other;
an obtaining unit that obtains the specifying information of the document from a document recipient; and
a transmitting unit that transmits the data part corresponding to the obtained specifying information to the document recipient.

9 Claims, 15 Drawing Sheets

BILLING STATEMENT

OO COMPANY

| BILLING AMOUNT | ¥20,000 | |
|---|---|---|

| ITEM | UNIT PRICE | QUANTITY | |
|---|---|---|---|
| ARTICLE A | ¥1,000 | 5 | ¥5,000 |
| ARTICLE B | ¥1,000 | 1 | ¥1,000 |
| ARTICLE C | ¥1,000 | 1 | ¥1,000 |
| ARTICLE D | ¥1,000 | 1 | ¥1,000 |
| ARTICLE E | ¥1,000 | 2 | ¥2,000 |
| ARTICLE F | ¥10,000 | 1 | ¥10,000 |
| | | | |
| | | | |
| | | | |
| | | | ¥20,000 |

I1

I2

```
BILLING STATEMENT
OO COMPANY
BILLING AMOUNT    ¥20,000
ITEM              UNIT PRICE    QUANTITY
ARTICLE A         ¥1,000        5           ¥5,000
ARTICLE B         ¥1,000        1           ¥1,000
ARTICLE C         ¥1,000        1           ¥1,000
ARTICLE D         ¥1,000        1           ¥1,000
ARTICLE E         ¥1,000        2           ¥2,000
ARTICLE F         ¥10,000       1           ¥10,000
                                            ¥20,000
```
D1

SYSTEM, PROCESSING DEVICE, AND NON-TRANSITORY COMPUTER READABLE STORAGE MEDIUM FOR STORING AND TRANSMITTING A DATA PART OF A DOCUMENT

CROSS-REFERENCE TO RELATED APPLICATIONS

This application is based on and claims priority under 35 USC 119 from Japanese Patent Application No. 2016-222111 filed Nov. 15, 2016 and Japanese Patent Application No. 2016-146828 filed Jul. 26, 2016.

BACKGROUND

Technical Field

The present invention relates to a system, a processing device, and a non-transitory computer readable storage medium.

SUMMARY

According to an aspect of the invention, a system includes:

a printing unit that prints a document including a data part;

a storage unit that stores (i) specifying information which uniquely specifies the document and (ii) the data part in association with each other;

an obtaining unit that obtains the specifying information of the document from a document recipient; and a transmitting unit that transmits the data part corresponding to the obtained specifying information to the document recipient.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the accompanying drawings.

First Exemplary Embodiment

[Configuration of System]

Figure 1:
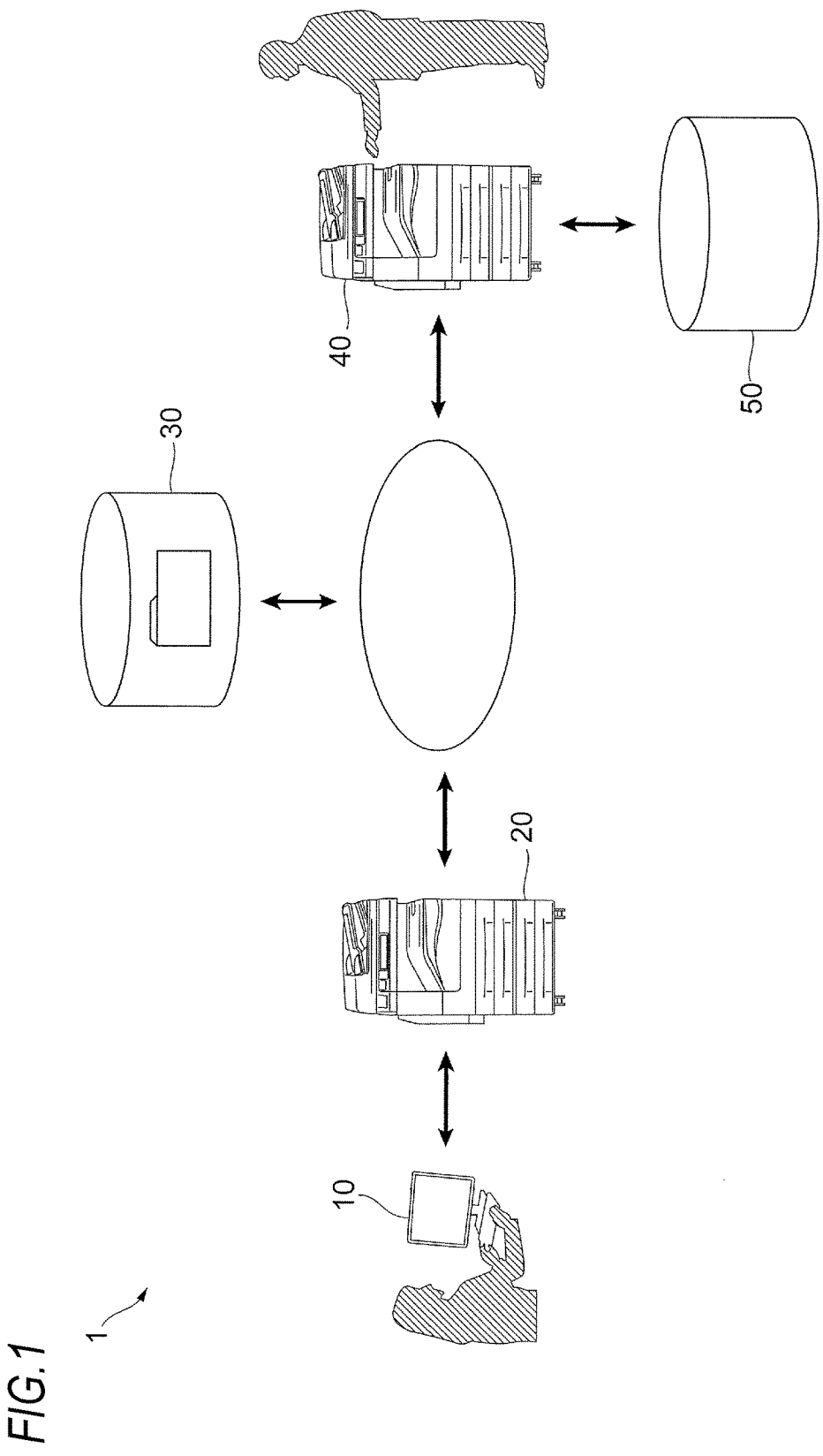
FIG. 1 is a view illustrating an exemplary configuration of a document transmitting and receiving system according to a first exemplary embodiment.

FIG. 1 is a view illustrating an exemplary configuration of a document transmitting and receiving system 1 according to a first exemplary embodiment.

As illustrated in FIG. 1, a document transmitting and receiving system 1 according to the first exemplary embodiment includes a terminal device 10, a first image processing device 20, a management server 30, a second image processing device 40, and a post-processing device 50. The terminal device 10, the first image processing device 20, the management server 30, the second image processing device 40, and the post-processing device 50 are data-connected to each other directly or via a network.

Although not illustrated in FIG. 1, plural second image processing devices 40 are provided. Further, the post-processing device 50 is data-connected to the second image processing device 40.

In the document transmitting and receiving system 1 according to the first exemplary embodiment, the sender transmits a document from the first image processing device 20 to the second image processing device 40 through the terminal device 10. Specifically, first, the sender creates the document using the terminal device 10. The created document is transmitted from the first image processing device 20 to the second image processing device 40 via the management server 30. The document is printed as paper in the second image processing device 40 to be received by the recipient.

As described above, in the document transmitting and receiving system 1 according to the first exemplary embodiment, the first image processing device 20 serves as a mailbox into which mail is inserted by the sender and the second image processing device 40 serves as a mail reception box from which the recipient receives the mail. Further, in the document transmitting and receiving system 1, an electronic postal service (here, referred to as this service) which transmits and receives a document through plural image processing devices is implemented. Further, in this service, the recipient may receive a document at any of the plural second image processing devices 40 which are provided in various locations.

The document transmitting and receiving system 1 according to the first exemplary embodiment implements a service by which the recipient electronically receives document information (an example of a data part) of a paper printed document based on a paper printed document received by the recipient. Further, in the document transmitting and receiving system 1 according to the first exemplary embodiment, the obtained document information may be automatically input to the post-processing device 50.

In the first exemplary embodiment, the second image processing device 40 serves as an example of a printing unit (a processing device) and an obtaining unit (obtaining section), and the management server 30 serves as an example of a storage unit and a transmitting unit. Further, the first image processing device 20 serves as an example of another printing device.

In the first exemplary embodiment, a document refers to an object on which information recognized by human perception, such as characters, signs, and images is described. Further, the sending of the document includes what becomes confidential correspondence when it is printed on paper. Here, the confidential correspondence refers to a document which represents the will of a sender or notifies facts to a specific recipient.

As the confidential correspondence, a letter, a billing statement, a seal imprint certificate, a copy of a resident's card, or direct mail in which a name of the recipient is written on the document itself may be exemplified. Further, as a document other than the confidential correspondence, a catalog and direct mail on which the name of the recipient is not written on the document itself may be exemplified.

Basic configurations of the first image processing device 20 and the second image processing device 40 are the same. Further, in the following description, the first image processing device 20 is a device which is used when the sender sends a document (hereinafter, referred to as a sender side device). In contrast, the second image processing device 40 is a device which is used when the recipient receives a document (hereinafter, referred to as a recipient side device).

Here, in some cases, the second image processing device 40 serves as the sender side device and the first image processing device 20 serves as the recipient side device. However, when a case when the first image processing device 20 and the second image processing device 40 serve as the sender side device and the recipient side device, respectively, is described, the functional configurations are repeated so that description will be complicated. Therefore, the following description will be made with the assumption that the first image processing device 20 serves as the sender side device and the second image processing device 40 serves as the recipient side device.

The terminal device 10 is a device which creates a document or sends the document through the first image processing device 20. As for the terminal device 10, for example, an installed personal computer (PC) or a portable terminal such as a mobile phone or a tablet terminal may be used.

The first image processing device 20 is a so-called multifunction device and has an image processing function such as copying, printing, image reading, and facsimile. Further, the first image processing device 20 has a function of transmitting a document created by the sender and information related to the document to the management server 30 as one of functions of implementing the service.

The management server 30 obtains the document transmitted by the sender to store the information of the document. Further, the management server 30 sends the stored document to the recipient side device based on an instruction from the recipient.

The second image processing device 40 is a so-called multifunction device and has an image processing function such as copying, printing, image reading, and facsimile. Further, the second image processing device 40 obtains the document from the management server 30 to print the obtained document on paper, as one of the functions of implementing the service.

The post-processing device 50 is a device which manages the document information by performing a predetermined processing using the document information (which will be described below) which is, for example, a data part of the document. For example, when the document information (which will be described below) of the document is a billing amount of a billing statement, the post-processing device 50 performs an accounting processing. Further, the document information (which will be described below) obtained by the second image processing device 40 is input to the post-processing device 50.

[Exemplary Hardware Configuration]

Figure 2:
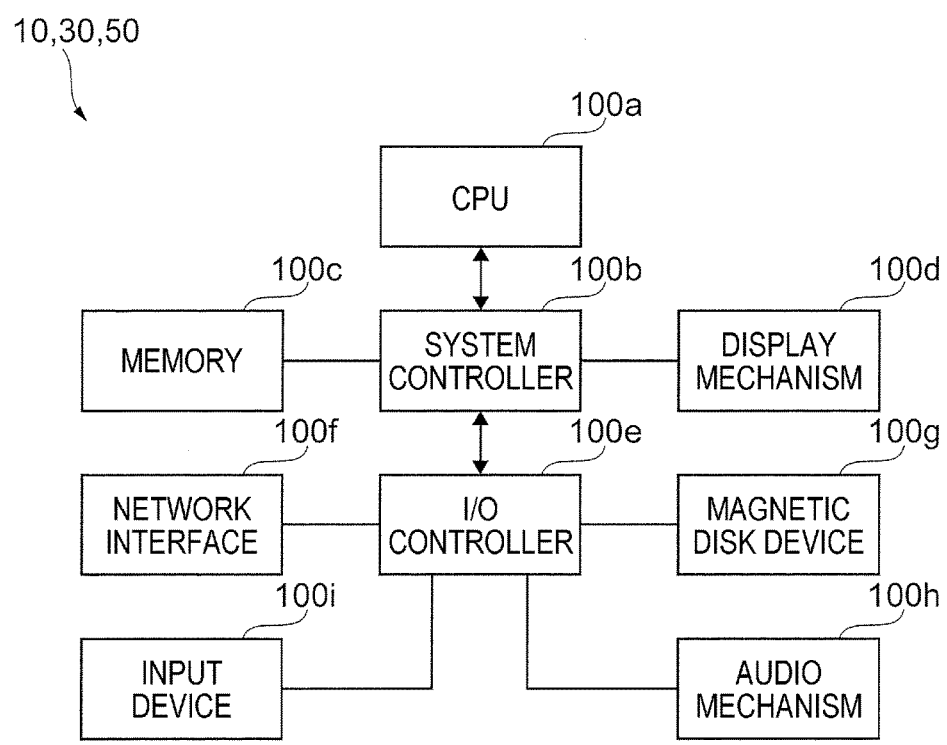
FIG. 2 is a view illustrating an exemplary hardware configuration of a terminal device, a management server, and a post-processing device according to the first exemplary embodiment.

FIG. 2 is a view illustrating an exemplary hardware configuration of the terminal device 10, the management server 30, and the post-processing device 50 of the first exemplary embodiment.

As illustrated in FIG. 2, the terminal device 10, the management server 30, and the post-processing device 50 include a central processing unit (CPU) 100a which serves as an arithmetic unit and a memory 100c which serves as a main memory. Further, each device includes a magnetic disk device (HDD: hard disk drive) 100g, a network interface 100f, a display mechanism 100d, an audio mechanism 100h, an input device 100i such as a keyboard or a mouse, and the like as external devices.

The memory 100c and the display mechanism 100d are connected to the CPU 100a through a system controller 100b. Further, the network interface 100f, the magnetic disk device 100g, the audio mechanism 100h, and the input device 100i are connected to the system controller 100b through an I/O controller 100e. Each component is connected by various buses such as a system bus or an input/output bus.

A program which implements each function is stored in the magnetic disk device 100g. Further, the program is loaded in the memory 100c, and the processing based on the program is executed by the CPU 100a, so that various functions are implemented.

[Hardware Configuration of First Image Processing Device 20 and Second Image Processing Device 40]

Figure 3:
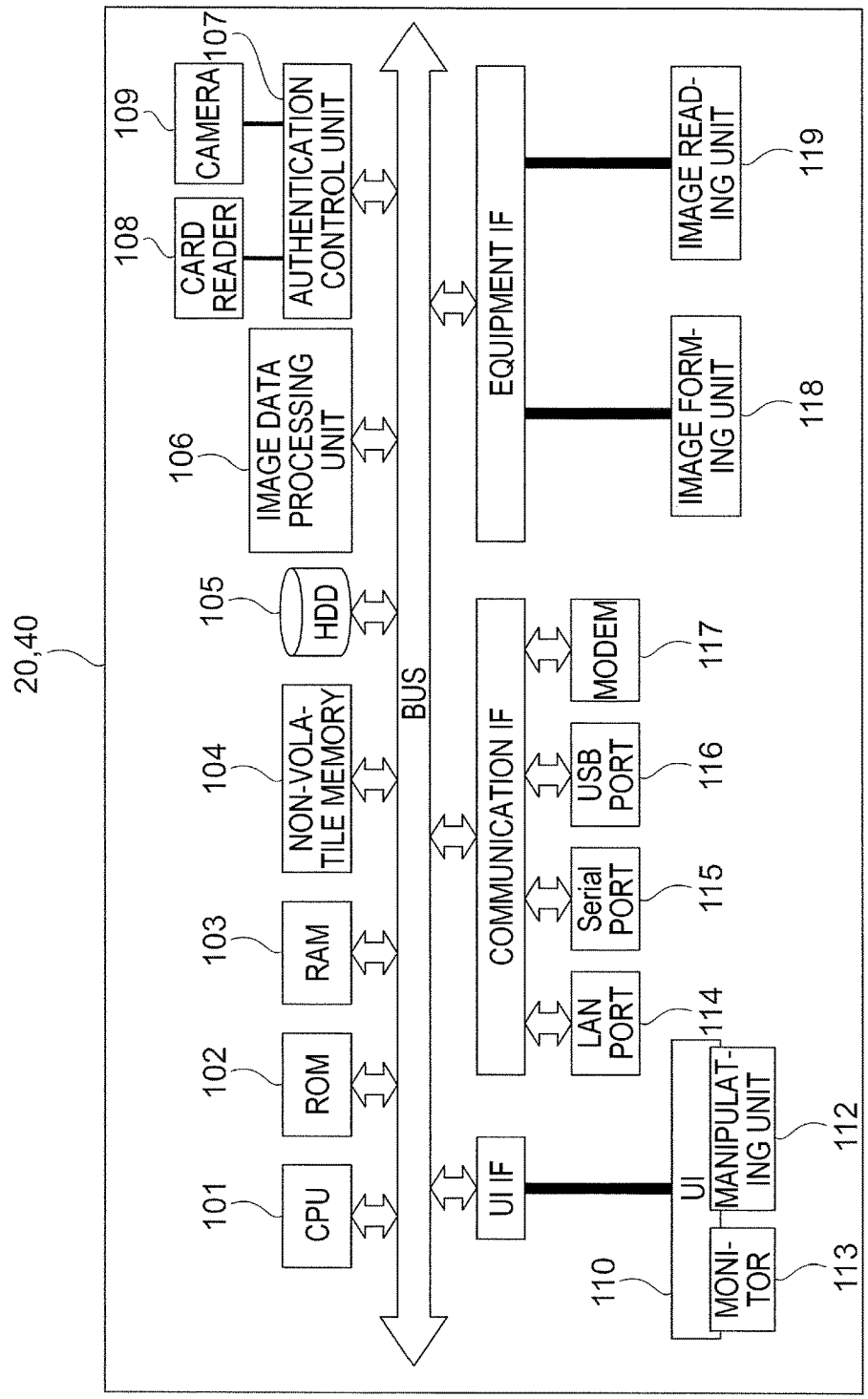
FIG. 3 is a view illustrating an exemplary hardware configuration of a first image processing device and a second image processing device according to the first exemplary embodiment.

FIG. 3 is a view illustrating an example of a hardware configuration of the first image processing device 20 and the second image processing device 40 according to the first exemplary embodiment.

As illustrated in FIG. 3, the CPU 101 loads various programs stored in a read only memory (ROM) 102 to a random access memory (RAM) 103 to execute the programs to perform main control of the first image processing device 20 and the second image processing device 40, thereby implementing the functions of the first image processing device 20 and the second image processing device 40. The ROM 102 is a memory in which various programs executed by the CPU 101 or predetermined fixed data are stored. The RAM 103 is a memory which is used as a working memory of the CPU 101. A non-volatile memory 104 is a memory which may hold the stored information even if the power is not supplied and stores a parameter used to adjust an image or various history data.

The HDD 105 is, for example, a magnetic disk device and stores image data read by an image reading unit 119 which will be described later or image data used to form an image in an image forming unit 118 which will also be described later.

The image data processing unit 106 performs processing on the image data such as expansion/compression processing of the image data. An authentication control unit 107 controls a card reader 108 and a camera 109. In order to record or calculate the information, the card reader 108 reads an IC card in which an integrated circuit (IC) is installed to obtain information recorded on the IC card. Further, the camera 109 captures an image including a user who manipulates an UI unit 110 by the camera.

The user interface (UI) unit 110 includes a manipulating unit 112 which accepts a contact manipulation of the user and a monitor 113 on which various images are displayed. The manipulating unit 112 accepts an instruction of an image processing function such as a printing function, a scanning function, a copying function, a facsimile function, and a document transmitting and receiving function of the first image processing device 20 and the second image processing device 40 by the user.

A local area network (LAN) port 114 is an interface through which data is input to or output from the outside. Further, in the first exemplary embodiment, the LAN port 114 also serves as a wireless communication interface. A serial port 115 is an interface which connects external peripheral devices. A universal serial bus (USB) port 116 is an interface which connects the peripheral devices through a USB cable. A modem 117 is a control unit which makes a connection of a facsimile machine or the like to a public line and enables provision of various facsimile functions.

The image forming unit 118 forms an image on paper which is an example of a recording medium. The image reading unit 119 reads the image recorded on the paper.

Here, a specific example of information handled by the document transmitting and receiving system 1 according to the first exemplary embodiment will be described with reference to FIGS. 4A to 4D. In this case, in FIGS. 4A to 4D, a billing statement is an example of a document.

FIGS. 4A to 4D are views illustrating an example of a paper printed document P1 and information according to the first exemplary embodiment.

Figure 4A:
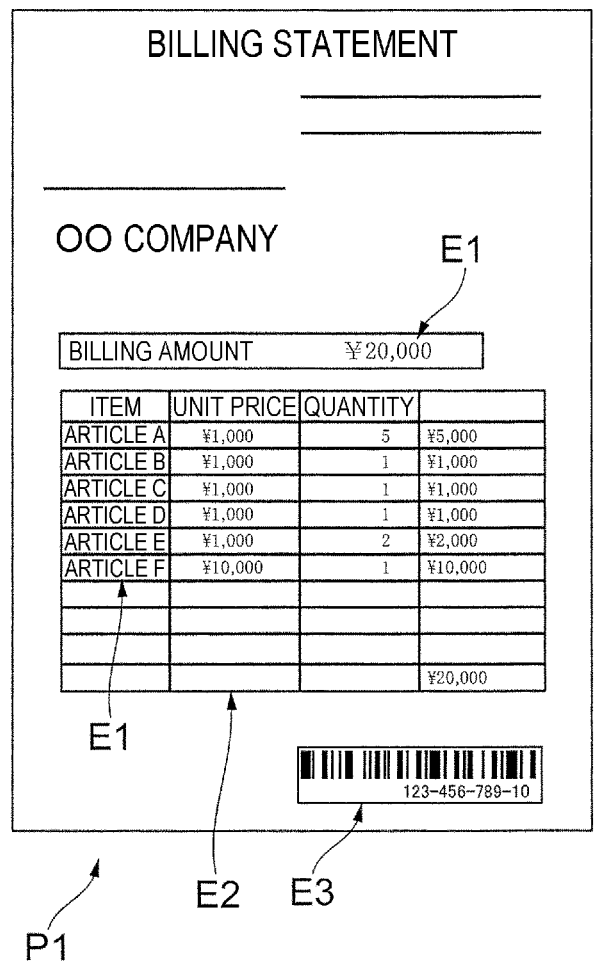
FIGS. 4A to 4D are views illustrating examples of a paper printed document and information according to the first exemplary embodiment.

As illustrated in FIG. 4A, a paper printed document P1 is printed based on a document file which is created by a sender using an application in the terminal device 10. In the first exemplary embodiment, the paper printed document P1 is printed with the second image processing device 40 by the recipient.

The paper printed document P1 includes a document element E1 which has contents notifying the will of the sender or a fact such as numbers or characters, a non-document element E2 other than the document information such as frames or underlines, and an identification element E3 which uniquely specifies the paper printed document P1.

Figures 4B, 4C:
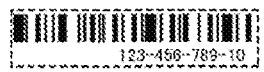

As illustrated in FIG. 4B, according to the first exemplary embodiment, a document image I1 which is an image file (a printing image) used to print the paper printed document P1 is created. Furthermore, as illustrated in FIG. 4C, an identification information image I2 for certifying an originality of the paper printed document P1 is created.

The document image I1 is obtained by making the document element E1 and the non-document element E2 as an image. Further, the identification information image I2 (an example of specifying information) is obtained by making the identification element E3 as an image.

The identification information image I2 is formed in a predetermined location (at a predetermined page and a predetermined location at a page). Specifically, in the first exemplary embodiment, the identification information image I2 is formed in a first page of the paper printed document P1. This is to easily perform an operation when the paper printed document P1 is read by the image reading unit 119 to extract the identification information image I2, which will be described below.

Figures 4D, 5:
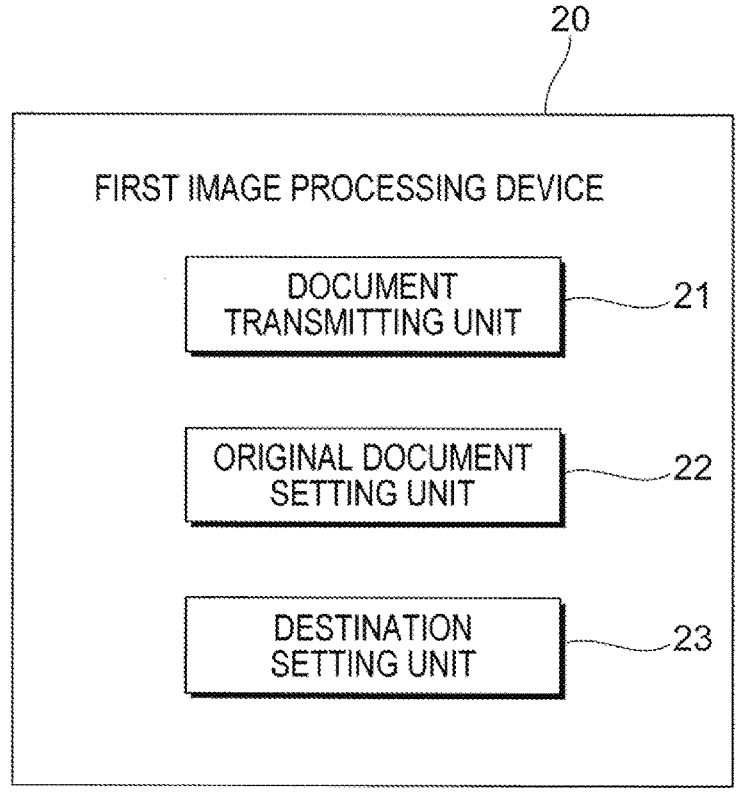
FIG. 5 is a functional block diagram of a first image processing device according to the first exemplary embodiment.

As illustrated in FIG. 4D, in the first exemplary embodiment, document information D1 is created as information to be associated with the paper printed document P1. The document information D1 is created based on the document element E1 and includes information such as numbers and characters.

Next, a functional configuration of each component related to the document transmitting and receiving system 1 will be described in detail.

[Functional Configuration of Terminal Device 10]

The terminal device 10 is connected to the first image processing device 20. In the terminal device 10, a printer driver to operate the first image processing device 20 is installed. The terminal device 10 may operate the image forming unit 118 or the image reading unit 119 in the first image processing device 20 or use this service through the first image processing device 20.

The terminal device 10 converts the document file created by the sender into page-description language (PDL) data to transmit the PDL data to the first image processing device 20.

[Functional Configuration of First Image Processing Device 20]

FIG. 5 is a functional block diagram of the first image processing device 20 according to the first exemplary embodiment.

As illustrated in FIG. 5, the first image processing device 20 has a document transmitting unit 21 that transmits a document, an original document setting unit 22 that certifies the originality, and a destination setting unit 23 that sets a destination serving as a recipient.

The document transmitting unit 21 creates the document image I1 (see FIG. 4B) based on the PDL data of the document file obtained from the terminal device 10. The document transmitting unit 21 transmits the document image I1 to the management server 30. Further, the document transmitting unit transmits the document information D1 (see FIG. 4D) received from the terminal device 10 to the management server 30.

The original document setting unit 22 sets the paper printed document P1 (see FIG. 4A) to be printed as an original document to certify that the paper printed document P1 is an original document. When the original document setting unit 22 receives a sender's instruction for setting the paper printed document P1 as an original document, the original document setting unit 22 transmits original document setting information which is information for instruction to set an original document to the management server 30.

The destination setting unit 23 sets destination information which is information on the recipient of the document. The destination setting unit 23 transmits the information on the destination to the management server 30 so as to be associated with the document image I1. In this case, the recipient of the document is not limited to a specific individual, but may be a company or a specific department of a company.

Next, when the sender uses this service, a sending screen which is displayed on a display mechanism 100d of the terminal device 10 will be described. In this case, the sending screen is displayed by the printer driver of the first image processing device 20.

Figure 6A:
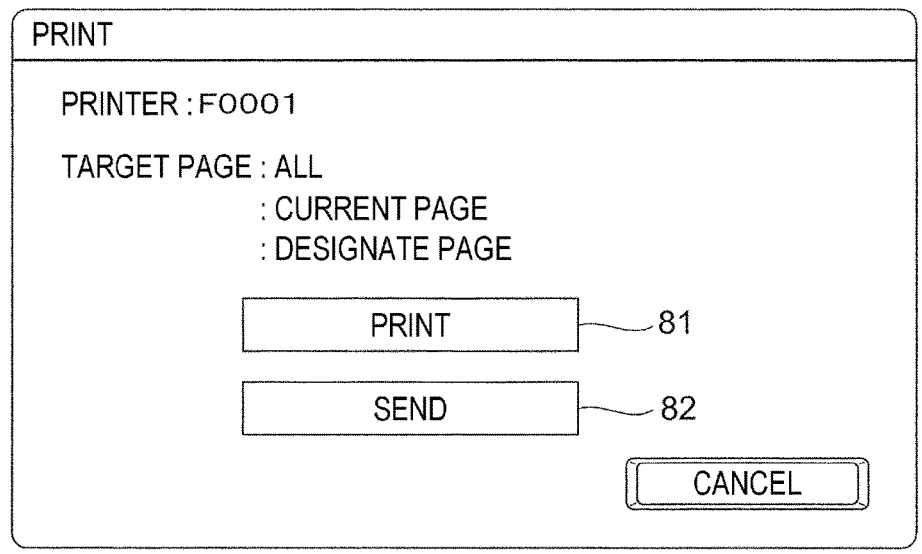
FIGS. 6A and 6B are views of an example of a document sending screen according to the first exemplary embodiment.
Figure 6B:
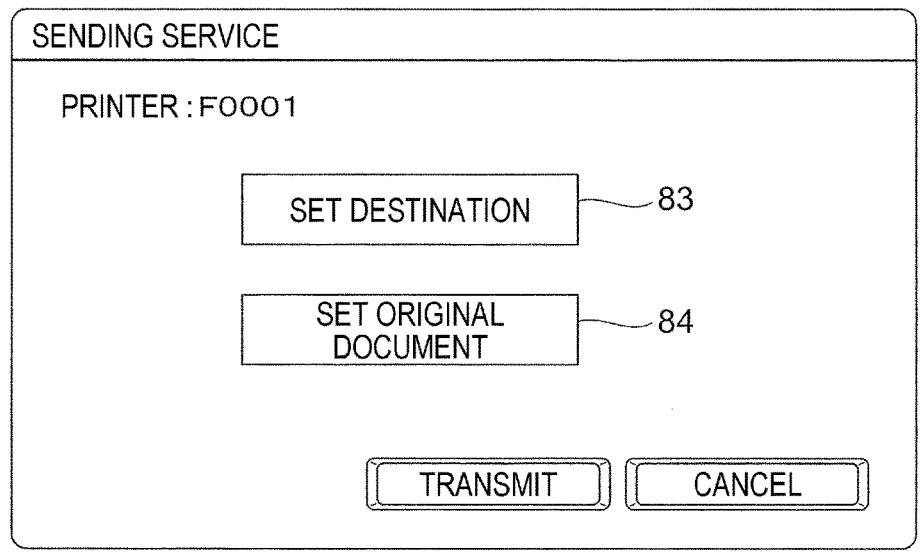

FIG. 6 is a view of an example of the sending screen of the document of the first exemplary embodiment.

For example, a screen for printing by the first image processing device 20 is opened from an application menu of the terminal device 10. By doing this, as illustrated in FIG. 6A, on the screen, a printing button 81 and a sending button 82 are displayed. The printing button 81 is a button for printing a document file by the first image processing device 20. In the meantime, the sending button 82 is a button for sending a document to the recipient through the first image processing device 20.

When the sending button 82 is selected, as illustrated in FIG. 6A, the sending screen for sending the document is displayed. The sending screen has a destination setting button 83 for setting a destination and the original document setting button 84 for setting the paper printed document P1 as an original document.

The destination setting button 83 is used to set a recipient or a recipient side device. When the destination setting button 83 is pressed, a list of names of recipients is displayed. Further, the sender designates a name of a recipient to which the document will be transmitted.

The original document setting button 84 is a button used to set a printed paper printed document P1 as an original document based on the document file to be transmitted. When the original document setting button 84 is pressed, original document setting information is transmitted to the first image processing device 20.

[Functional Configuration of Management Server 30]

Figure 7:
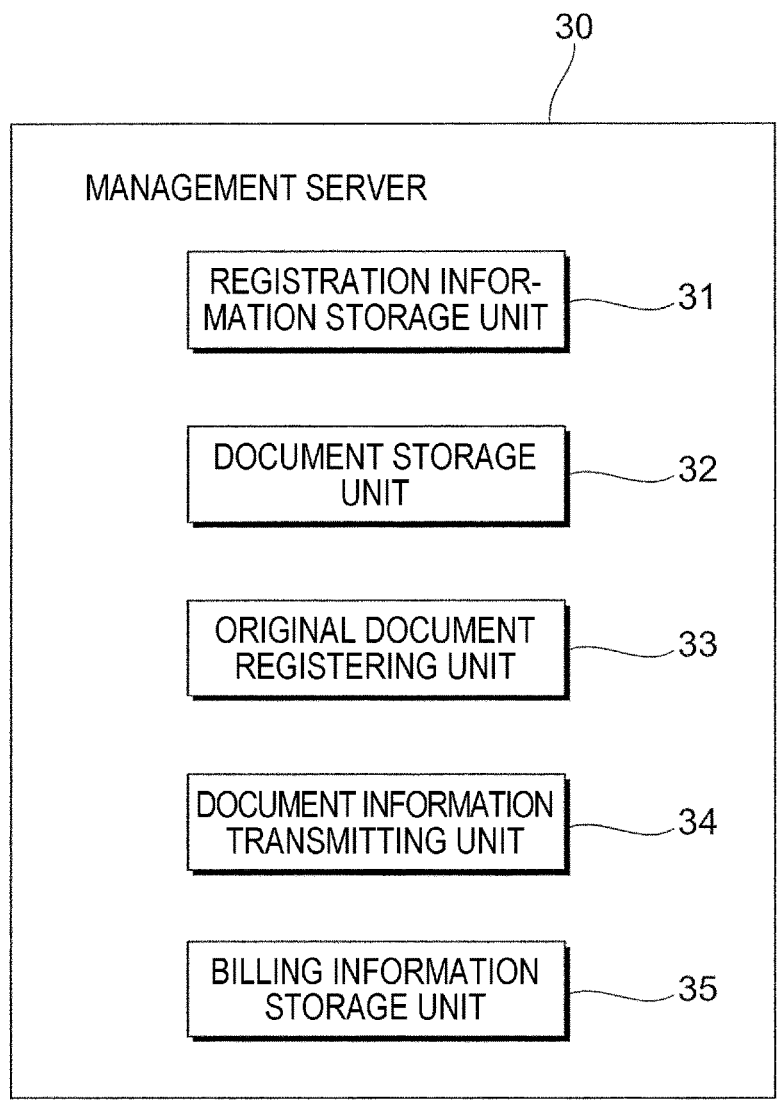
FIG. 7 is a functional block diagram of a management server according to the first exemplary embodiment.

FIG. 7 is a functional block diagram of the management server 30 of the first exemplary embodiment.

As illustrated in FIG. 7, the management server 30 includes a registration information storage unit 31 that stores registration information regarding use of this service, a document storage unit 32 that stores the document image I1 and the document information D1, an original document registering unit 33 that registers originality of the paper printed document P1, a document information transmitting unit 34 which transmits the document information D1, and a billing information storage unit 35 that stores information regarding the billing.

The registration information storage unit 31 stores registration information such as a registered name (a registered company name) of a user who uses this service, a user ID, and a usage password. The registration information storage unit 31 allows the second image processing device 40 to refer to the stored registration information when the recipient performs log-in authentication.

The document storage unit 32 stores the document image I1 transmitted from the first image processing device 20. Further, the document storage unit 32 stores the destination information of the document in association with the document image I1. The document storage unit 32 transmits the stored document image I1 to the second image processing device 40 in accordance with a request from the second image processing device 40.

The document storage unit 32 stores the document information D1 corresponding to the document image I1 received from the first image processing device 20.

The original document registering unit 33 registers the original document of the document image I1 which is set as an original document. In order to certify the originality of the paper printed document P1, the original document is registered by storing the document image I1 which becomes a basis of the paper printed document P1 and information for identifying the paper printed document P1 corresponding to the document image I1. The original document registering unit 33 of the first exemplary embodiment creates an identification information image I2 for identifying that the paper printed document P1 is an original document. The identification information image I2 is an image which uniquely specifies the paper printed document P1. Further, the original document registering unit stores the document image I1 and the identification information image I2 in association with each other.

The original document registering unit 33 stores printing history information which is a history of printing the document image I1 in the second image processing device 40. When the document image I1 is printed at the first time, the original document registering unit 33 transmits the identification information image I2 corresponding to the document image I1 to the second image processing device 40. Further, when second or subsequent printing of the document image I1 is performed, the original document registering unit does not transmit the corresponding identification information image I2 to the second image processing device 40. That is, the originality is certified only for the first printed paper printed document P1.

In this case, the certification of the originality of the paper printed document P1 is not limited to directly printing the identification information image I2 on the paper printed document P1. For example, when the document image I1 is printed, a paper fingerprint of the paper to be printed is read in advance. The original document registering unit 33 may manage the originality of the paper printed document P1 by storing information of the paper fingerprint.

The number of times of printing the paper printed document P1 whose originality is certified is not limited to one time as described above, but may be a predetermined number of times.

The document information transmitting unit 34 transmits the document information D1 corresponding to the paper printed document P1 to the second image processing device 40 based on the request from the second image processing device 40. The document information transmitting unit 34 obtains a read-out image of the identification information image I2 which is read by the second image processing device 40. The document information transmitting unit 34 transmits the document information D1 corresponding to the identification information image I2 obtained from the second image processing device 40 to the second image processing device 40.

The document information transmitting unit 34 manages transmission history information which is information on the history transmitting the document information D1. The document information transmitting unit 34 limits the number of times of transmitting the document information D1 to the second image processing device 40 (recipient) to a predetermined number of times. In the first exemplary embodiment, the document information transmitting unit 34 limits the transmission of the document information D1 to one time.

The billing information storage unit 35 stores information on a bill to the sender or the recipient when the sender sends the document or the recipient receives the document.

For example, when the sender transmits the PDL data of the document file and when the management server 30 receives the PDL data as the document image I1, the billing information storage unit 35 charges the sender. Further, in the first exemplary embodiment, when the recipient obtains the document information D1, the billing information storage unit 35 charges the recipient.

[Functional Configuration of Second Image Processing Device 40]

Figure 8:
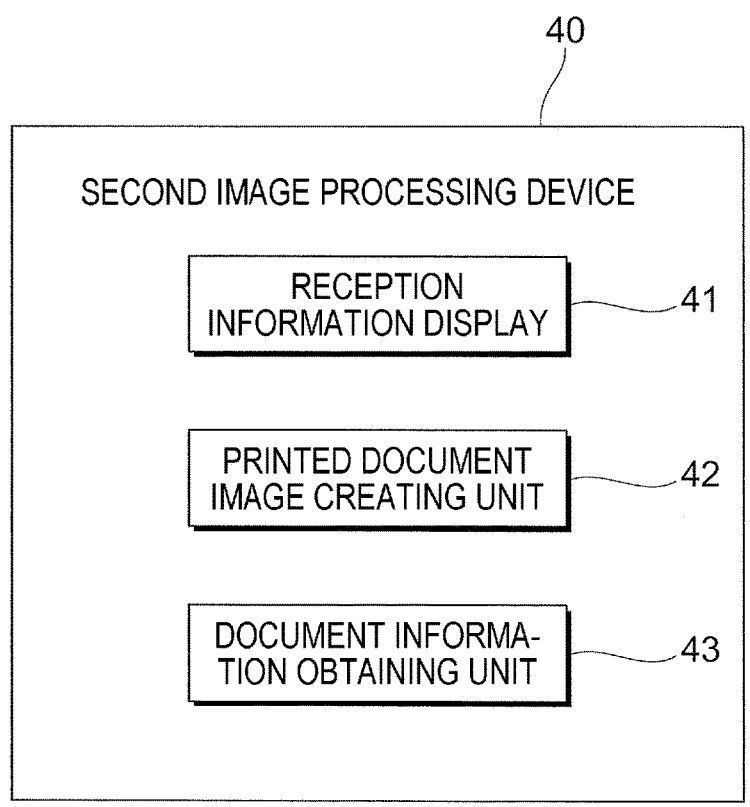
FIG. 8 is a functional block diagram of a second image processing device according to the first exemplary embodiment.

FIG. 8 is a functional block diagram of the second image processing device 40 according to the first exemplary embodiment.

As illustrated in FIG. 8, the second image processing device 40 includes a reception information display 41 that displays information regarding a transmitting and receiving service, a printed document image creating unit 42 that creates a printed document image, and a document information obtaining unit 43 that obtains document information.

The reception information display 41 displays various messages for this service on the UI unit 110. For example, when a recipient who logs in the second image processing device 40 has a document image I1 which has not been received, the reception information display 41 displays a notification indicating that there is a document image I1 which has not been received.

The printed document image creating unit 42 receives the document image I1 from the management server 30. Further, the printed document image creating unit 42 receives the identification information image I2 corresponding to the document image I1 from the management server 30. The printed document image creating unit 42 overlaps the received document image I1 and the identification information image I2. Further, the printed document image creating unit 42 allows the image forming unit 118 to print the overlapping image as the paper printed document P1.

When the paper printed document P1 is printed by the recipient, the printed document image creating unit 42 transmits information indicating that the printing has been performed to the management server 30.

The document information obtaining unit 43, for example, transmits an image of the identification information image I2 of the paper printed document P1 read by the image reading unit 119 to the management server 30. The document information obtaining unit 43 obtains document information D1 corresponding to the identification information image I2 from the management server 30. Further, the document information obtaining unit 43 transmits the obtained document information D1 to the post-processing device 50.

[Exemplary Operation of Document Transmitting and Receiving System 1]

Figure 9:
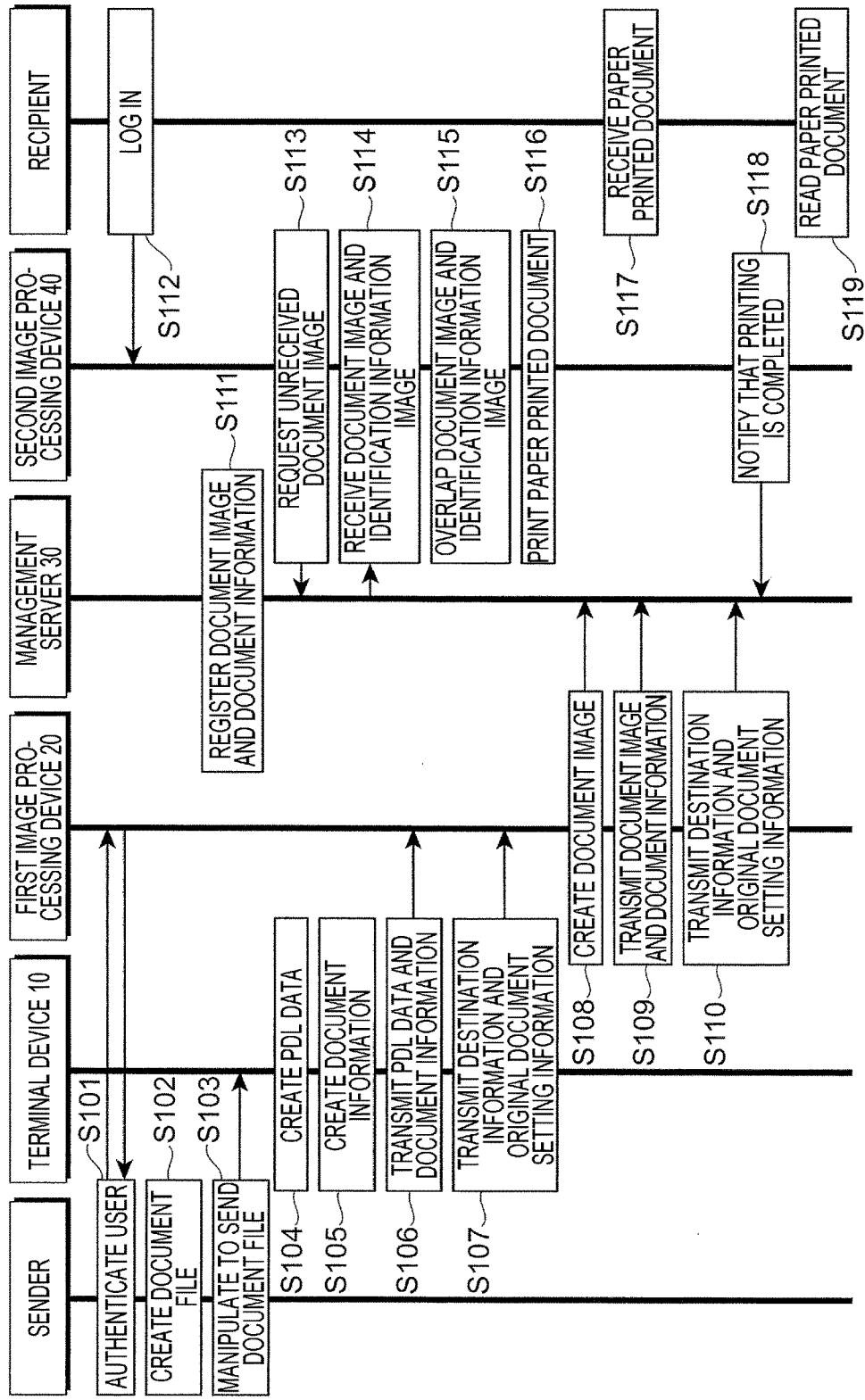
FIG. 9 is a sequence diagram when a sender transmits a document file to a management server.

FIG. 9 is a sequence diagram when the sender transmits the document file to the management server 30.

Next, an exemplary operation of the document transmitting and receiving system will be described specifically. Here, the sender sends the document from the terminal device 10 (the first image processing device 20) to the recipient. The recipient prints the paper printed document P1 by the second image processing device 40. Further, the recipient obtains the document information D1 based on the paper printed document P1. Further, an example in which the document information D1 is input to the post-processing device 50 is used.

In the following example, the sender uses a predetermined formatted document as a document file. Further, the sender inputs a billing amount or a billing item in a predetermined section of the formatted document. In the formatted document, a position of the frame is determined in advance and a position where figures are input is also determined in advance. A specification of the formatted document is commonly recognized in the terminal device 10, the first image processing device 20, the management server 30, the second image processing device 40, and the post-processing device 50.

As illustrated in FIG. 9, the sender performs authentication of a user who uses this service on the first image processing device 20 through the terminal device 10 (S101). The sender creates the document file by inputting a predetermined formatted document using a specific application which operates on the terminal device 10 (S102).

Then, the sender manipulates to send the document such as a formatted document to the recipient, through the terminal device 10 (S103). When the sending manipulation is performed, the sender sets the destination or the original document. When sending the formatted document, the terminal device 10 converts a formatted document file into PDL to create the PDL data (S104). The terminal device 10 creates document information D1 obtained by extracting information such as numbers or characters which are data parts of the formatted document (S105). The terminal device 10 transmits the PDL data and the document information D1 to the first image processing device 20 (S106). Further, the first image processing device 20 transmits destination information and original document setting information to the management server 30 (S107).

The first image processing device 20 creates the document image I1 based on the PDL data (S108). The first image processing device 20 transmits the document image I1 and the document information D1 to the management server 30 (S109). Further, the first image processing device 20 transmits destination information and original document setting information to the management server 30 (S110).

The management server 30 registers the received document image I1 and document information D1 (S111). Specifically, the management server 30 assigns identification information to the received document image I1 and document information D1. Further, the management server 30 creates an identification information image I2 corresponding to assigned identification information.

In the meantime, the recipient logs in the second image processing device 40 (S112). The second image processing device 40 requests the management server 30 to transmit an unreceived document image I1 which is transmitted to the logged-in recipient (S113). Further, the document image I1 to be received is selected by the recipient. Thereafter, the second image processing device 40 receives the selected document image I1 and the identification information image I2 corresponding to and document image I1 (S114). The second image processing device 40 overlaps the document image I1 and the identification information image I2 (S115). Further, the second image processing device 40 prints the overlapping image as the paper printed document P1 (S116). In the meantime, the recipient receives the paper printed document P1 (S117).

The second image processing device 40 transmits notification indicating that the printing of the paper printed document P1 is completed to the management server 30 (S118).

By doing this, in the document transmitting and receiving system 1 of the first exemplary embodiment, a service which allows the recipient to receive a document file which is sent by the sender as the paper printed document P1 through the first image processing device 20 and the second image processing device 40 is achieved.

Thereafter, the recipient reads the paper printed document P1 (S119). The reading of the paper printed document P1 will be described with reference to FIG. 10.

Figure 10:
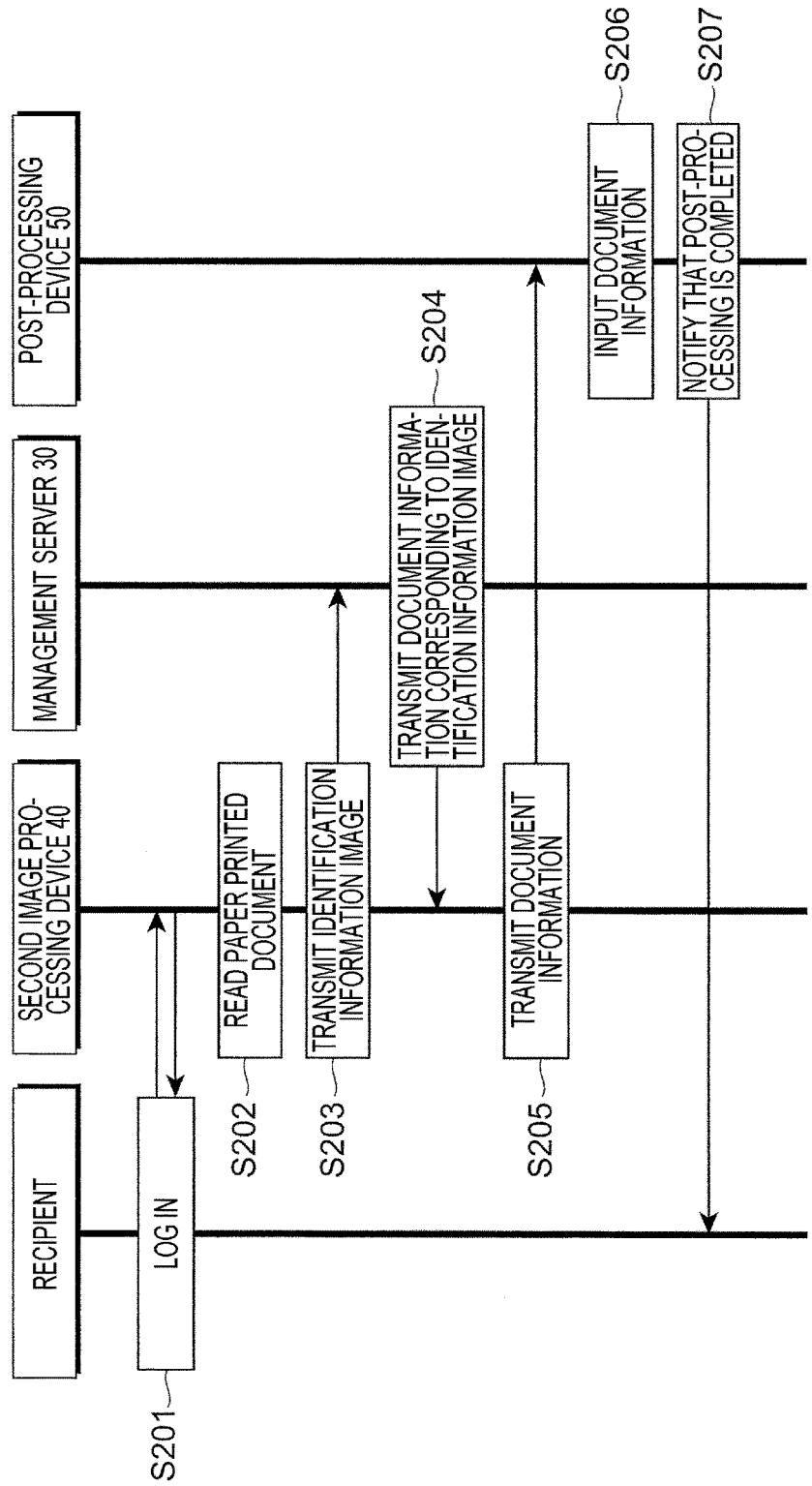
FIG. 10 is a sequence diagram when a recipient reads a paper printed document.

FIG. 10 is a sequence diagram when the recipient reads the paper printed document P1.

As illustrated in FIG. 10, the recipient logs in the second image processing device 40 (S201). In this case, when the document information D1 is received as it will be described below, confirmation that the document information D1 is automatically transmitted to the post-processing device 50 will be performed on the recipient.

The recipient reads the paper printed document P1 by the image reading unit 119 of the second image processing device 40 (S202). The second image processing device 40 transmits the image of the identification information image I2 read from the paper printed document P1 to the management server 30 (S203).

Thereafter, the management server 30 searches for document information D1 corresponding to the identification information image I2 to transmit the document information D1 to the second image processing device 40 (S204).

The second image processing device 40 transmits the obtained document information D1 to the post-processing device 50 (S205).

The obtained document information D1 is input to the post-processing device 50 in accordance with a predetermined process (S206). Further, in the first exemplary embodiment, when the document information D1 is obtained, the post-processing device 50 transmits notification indicating that the document information is obtained to the terminal device 10 which is used by the recipient or the second image processing device 40 (recipient) (S207).

Next, a flow of a processing when the recipient reads the paper printed document P1 will be described in detail.

Figure 11:
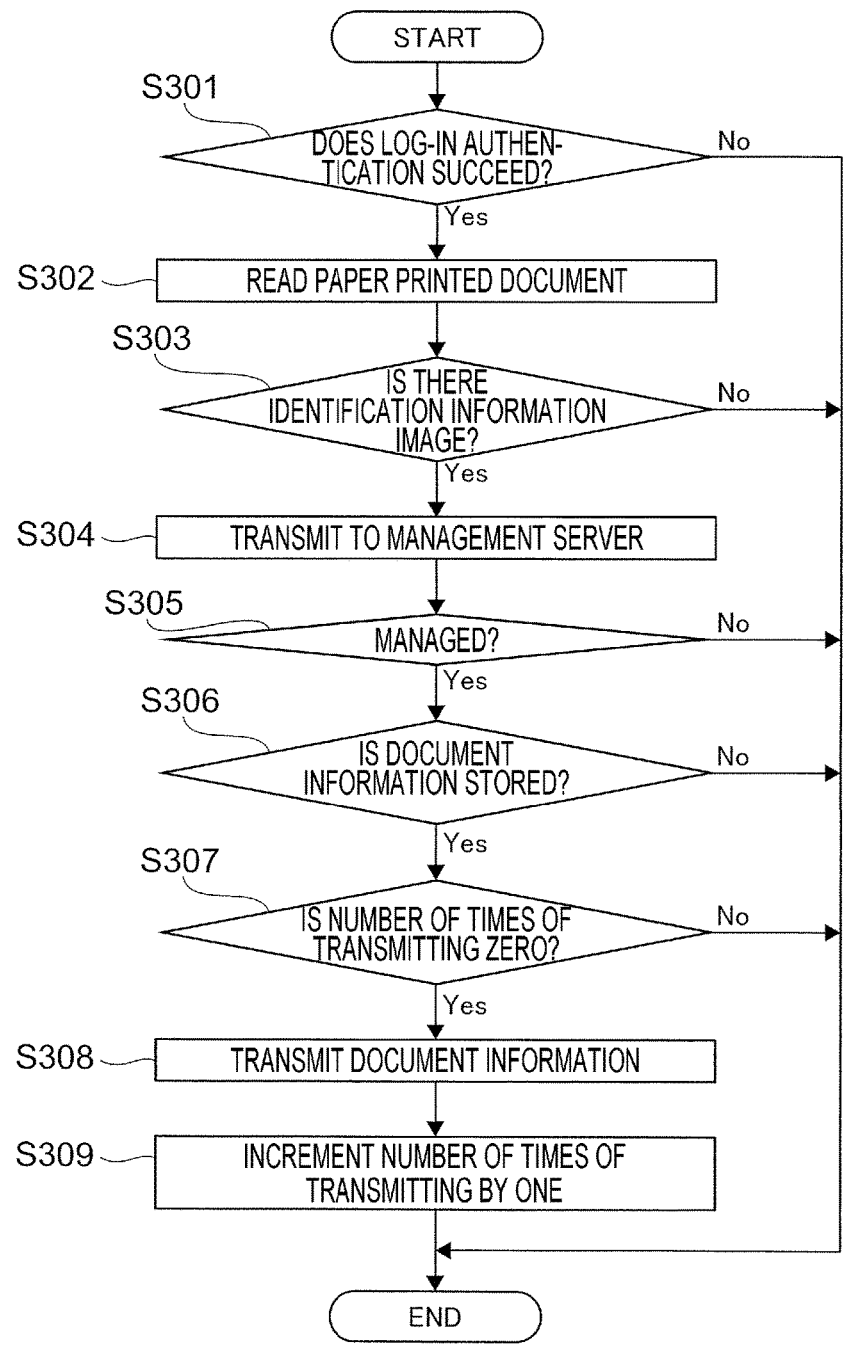
FIG. 11 is a flowchart when a recipient obtains document information from a management server.

FIG. 11 is a flowchart when the recipient obtains the document information D1 from the management server 30.

First, the recipient performs log-in authentication in the second image processing device 40 (S301). The log-in authentication is performed based on registration information stored in the registration information storage unit 31 of the management server 30. When the log-in authentication fails (No in S301), the processing ends.

When the login authentication succeeds in S301 (Yes in S301), the image reading unit 119 reads the paper printed document P1 (S302). Further, the second image processing device 40 analyzes the read image to determine whether the identification information image I2 is included (S303). When the identification information image I2 is not included (No in S303), the processing ends.

In the meantime, when the identification information image I2 is included in S303 (Yes in S303), the identification information image I2 is transmitted to the management server 30 (S304). Further, when the identification information image of the paper printed document P1 is read, the read identification information image I2 is not necessarily transmitted to the management server 30 as it is. The second image processing device 40 may transmit not only the identification information image I2 as it is, but also information obtained based on the identification information image I2 to the management server 30.

For example, when numbers or the like are written in the identification information image I2, the numbers may be manually input by the recipient to transmit the numbers to the management server 30.

The management server 30 determines whether the identification information image I2 obtained from the second image processing device 40 is managed (S305). In step S305, when the identification information image I2 is not managed, the processing ends.

Meanwhile, when the management server 30 manages the identification information image I2 (Yes in S305), it is checked whether the document information D1 corresponding to the identification information image I2 is stored (S306). Further, when the document information D1 corresponding to the identification information image I2 is not stored in the management server 30 in S306 (No in S306), the processing ends.

When the document information D1 corresponding to the identification information image I2 is stored in the management server 30 (Yes in S306), it is determined whether the number of times of transmitting the document information D1 is zero by referring to transmission history information stored in the document information transmitting unit 34 (S307). In the first exemplary embodiment, the transmission of the document information D1 based on an arbitrary identification information image I2 is limited to only one time. Therefore, only when the number of times of transmitting is zero, the management server 30 transmits the document information D1. Here, when the number of times of transmitting is not zero, the management server 30 ends the processing (No in S307).

In the meantime, when the number of times of transmitting the document information D1 is zero (Yes in S307), the management server 30 transmits the document information D1 to the second image processing device 40 (S308). After transmitting the document information D1, the management server 30 increments a value of the number of times of transmitting the document information D1 by one (S309). Next, a series of processing ends.

In the above-described example, the number of times of transmitting the document information D1 is limited to one time. It should be noted that the number of times of transmitting is not limited to one time. Alternatively, the number of times of transmitting may be arbitrary times. In this case, the number of times of transmitting the document information D1 may be limited by setting when the number of times of transmitting is determined in step S307.

In the first exemplary embodiment, when the recipient obtains the document information D1 based on the paper printed document P1, the recipient is charged. Here, as described above, when the number of times of obtaining the document information D1 is limited, the recipient is not charged until a predetermined number of times is reached. However, when the number of times of obtaining exceeds the predetermined number of times, the recipient may be charged.

<Another Exemplary Operation>

Another exemplary operation of the document transmitting and receiving system 1 of the first exemplary embodiment will be described.

In the other exemplary operation, an example in which after transmitting the document image I1 and the document information D1 to the management server 30 already, the sender modifies the document file will be described.

The sender, for example, modifies the document file using the terminal device 10. Thereafter, the sender prints the modified document file. The sender reads the paper printed document which is printed based on the modified document file by the image reading unit 119 of the first image processing device 20.

The first image processing device 20 compares the read image with a document image I1 which is stored in the management server 30 before being modified to extract difference information. When there is a difference, the first image processing device 20 newly creates the document image I1 based on the modified document file and newly creates the document information D1 based on the modified document file. The first image processing device 20 replaces the newly created document image I1 and the document information D1 with the document image I1 and the document information D1 which have been already stored in the management server 30.

As described above, in the other exemplary operation, the modified paper printed document is read by the image reading unit 119 to update the document image and the document information which have been already stored in the management server 30.

Second Exemplary Embodiment

Next, a document transmitting and receiving system 1 of a second exemplary embodiment will be described. In the meantime, in the second exemplary embodiment, a sender prints a document file as a paper printed document P1 by a first image processing device 20. Then, the sender mails the paper printed document P1 to a recipient. Thereafter, an example in which the recipient electronically obtains the document information D1 based on the received paper printed document P1 will be described.

In the second exemplary embodiment, a configuration similar to the first exemplary embodiment is denoted by the same reference numeral and detailed description thereof will be omitted.

Figure 12:
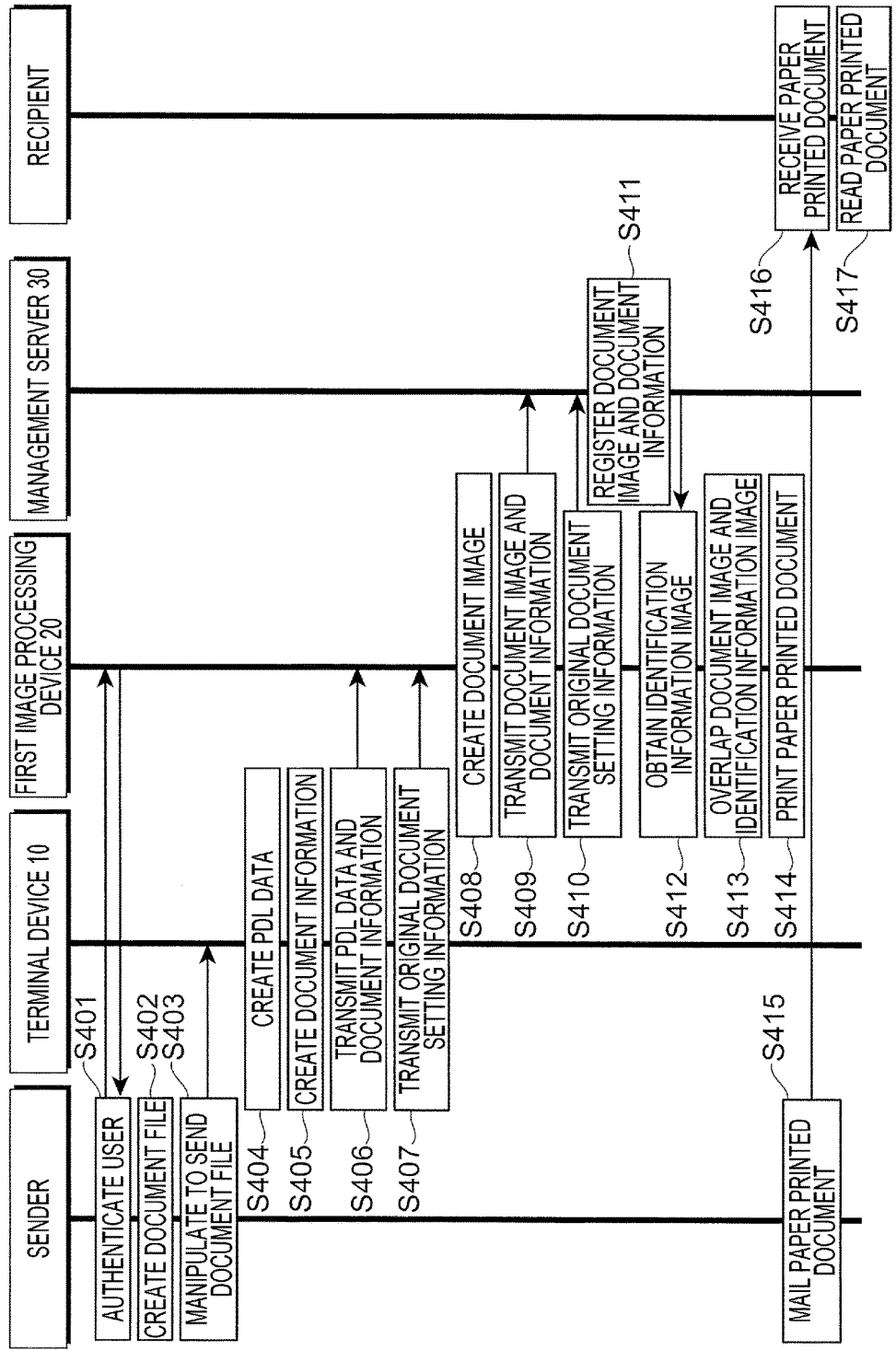
FIG. 12 is a sequence diagram of a document transmitting and receiving system according to a second exemplary embodiment.

FIG. 12 is a sequence diagram of the document transmitting and receiving system 1 of the second exemplary embodiment.

As illustrated in FIG. 12, the sender performs authentication of a user who uses a transmitting and receiving service through the first image processing device 20 in the terminal device 10 (S401). Then, the sender inputs a predetermined formatted document using a specific application which operates on the terminal device 10 (S402).

The sender manipulates to send the document such as a formatted document to the recipient, through the terminal device 10 (S403). In the second exemplary embodiment, since the sender mails the paper printed document P1, when the sending manipulation is performed, the document file is set as an original document, but information on a destination is not set.

When the document file is sent, the terminal device 10 converts the formatted document file into PDL data (S404). The terminal device 10 creates document information D1 obtained by extracting information on numbers or characters which are data parts of the document file (S405). The terminal device 10 transmits the PDL data and the document information D1 to the first image processing device 20 (S406). Further, the terminal device 10 transmits original document setting information to the first image processing device 20 (S407).

The first image processing device 20 creates the document image I1 based on the PDL data (S408). The first image processing device 20 transmits the document image I1 and the document information D1 to the management server 30 (S409). Further, the first image processing device 20 transmits the original document setting information to the management server 30 (S410).

The management server 30 registers the received document image I1 and document information D1 (S411). Specifically, the management server 30 assigns identification information to the received document image I1 and document information D1. Further, the management server 30 creates an identification information image I2 corresponding to assigned identification information.

Thereafter, the first image processing device 20 obtains identification information image I2 corresponding to the document image I1 (S412). The first image processing device 20 overlaps the document image I1 and the identification information image I2 (S413). Further, the first image processing device 20 prints the overlapping image as the paper printed document P1 (S414).

The sender mails the paper printed document P1 to a recipient (S415). The recipient receives the paper printed document P1 (S416). Thereafter, the recipient reads the paper printed document P1 (S417). The reading of the paper printed document P1 is the same as the description with reference to FIG. 10.

By doing this, in the document transmitting and receiving system 1 of the second exemplary embodiment, the document image I1 and the document information D1 of the document file transmitted by the sender are registered in the management server 30. In the meantime, the sender sends the paper printed document P1 to the recipient. The recipient electronically obtains the document information D1 corresponding to the paper printed document P1 based on the paper printed document P1 received by mail.

<Another Exemplary Operation>

Another exemplary operation of the document transmitting and receiving system 1 of the second exemplary embodiment will be described.

In the other exemplary operation, a processing in which after transmitting the document image I1 and the document information D1 to the management server 30 already, the sender modifies the paper printed document P1 will be described.

In some cases, the sender may perform modification such as signature or seal on the paper printed document P1 printed by the first image processing device 20 after printing the document as paper. In this case, an original document as paper and the document image I1 stored in the management server 30 at this time may be different from each other, for example, only in a signed or sealed part.

In the other exemplary operation, the sender reads the modified paper printed document P1 by the image reading unit 119 of the first image processing device 20. The read image is replaced with the document image I1 stored in the management server 30. Therefore, the contents of the paper printed document P1 which is mailed by the sender corresponds to the contents of the document image I1 stored in the management server 30.

In the above-described first exemplary embodiment, a time limit may be set for a period when the recipient is capable of obtaining the document image I1 or the document information D1 from the management server 30. After the predetermined period elapses, the management server 30 may not transmit the identification information image I2 together with the document image I1 to the recipient. In this case, after the predetermined period elapses, the originality of the paper printed document P1 is not certified and the obtaining of the document information D1 based on the paper printed document P1 is limited.

In the first exemplary embodiment and the second exemplary embodiment, the document image I1 of the document file is transmitted from the first image processing device 20 to the management server 30. Alternatively, the PDL data of the document file may be transmitted, instead of the document image I1. Further, the identification information image I2 transmitted from the management server 30 may be transmitted as the PDL data.

In the above-described first exemplary embodiment and second exemplary embodiment, the document information D1 is created by extracting information such as numbers or characters from the document file. It should be noted that the present invention is not limited thereto. For example, the document information D1 may be created from the PDL data of the document file. Further, the document information D1 may be created, for example, from the document image I1.

In the first exemplary embodiment and the second exemplary embodiment, the configuration of the functional units which implement this service in the terminal device 10, the first image processing device 20, the management server 30, and the second image processing device 40 is not limited to the above-described aspect. For example, in the first exemplary embodiment, a function of creating the document information D1 based on the document file may be performed by the second image processing device 40 or the management server 30. Further, for example, a function of creating the identification information image I2 may be performed by the first image processing device 20 or the second image processing device 40 and information on the created identification information image I2 may be transmitted to the management server 30.

Third Exemplary Embodiment

Figure 13:
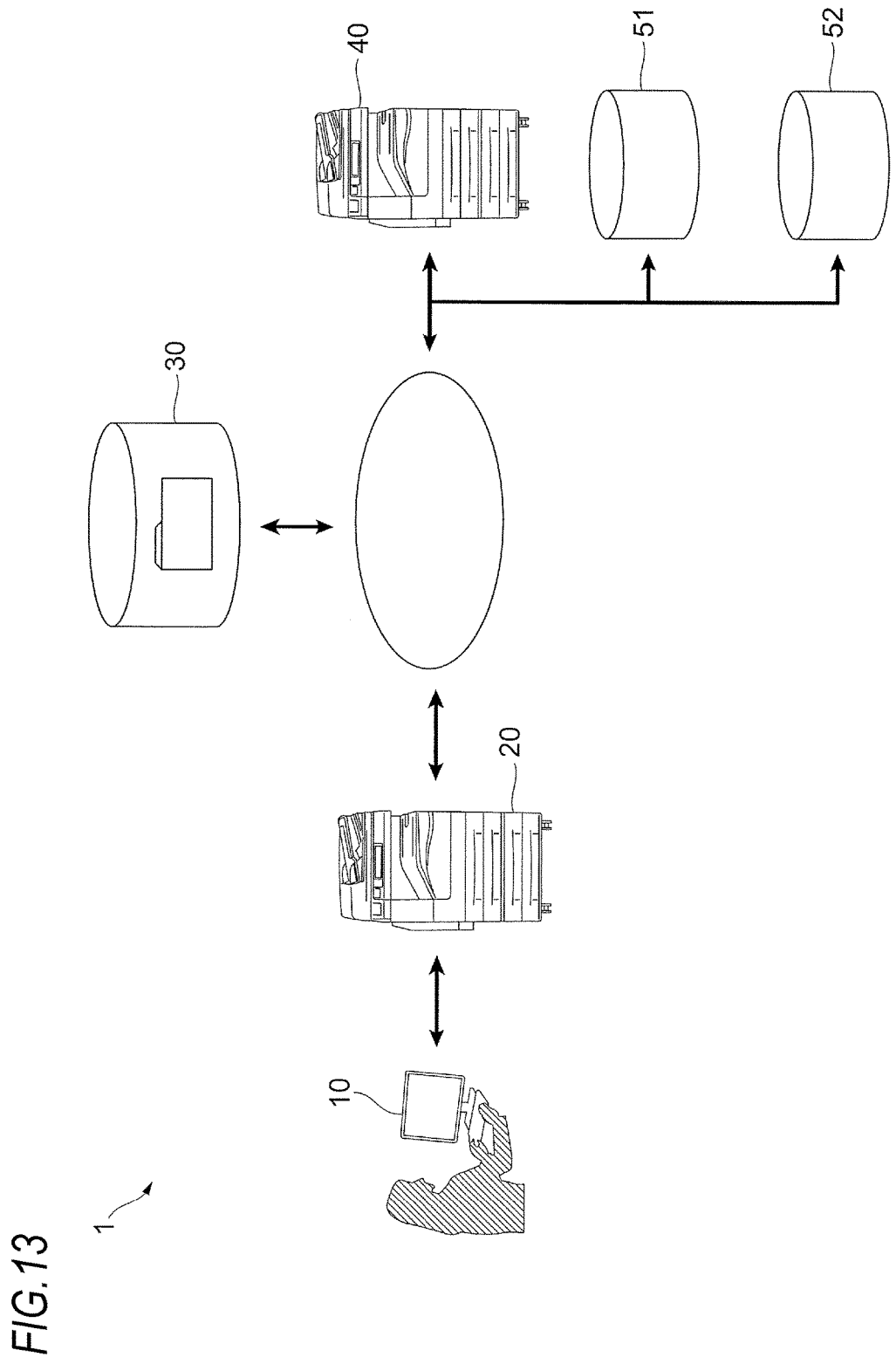
FIG. 13 is a view illustrating an exemplary configuration of a document transmitting and receiving system according to a third exemplary embodiment.

FIG. 13 is a view illustrating an exemplary configuration of a document transmitting and receiving system 1 according to a third exemplary embodiment.

In the third exemplary embodiment, a configuration similar to the other exemplary embodiments is denoted by the same reference numeral and a detailed description thereof will be omitted.

A document transmitting and receiving system 1 according to the third exemplary embodiment includes a terminal device 10, a first image processing device 20, a management server 30, a second image processing device 40, a first post-processing device 51, and a second post-processing device 52. The terminal device 10, the first image processing device 20, the management server 30, the second image processing device 40, the first post-processing device 51, and the second post-processing device 52 are data-connected directly or via a network.

Also in the document transmitting and receiving system 1 according to the third exemplary embodiment, similarly to the first exemplary embodiment, the sender transmits a document image I1 (see FIGS. 4A to 4D) from the first image processing device 20 to the second image processing device 40 via the terminal device 10. Specifically, the sender creates the document using the terminal device 10. The created document is transmitted from the first image processing device 20 to the second image processing device 40 as a document image I1 via the management server 30. The document image I1 is printed by the second image processing device 40 as the paper printed document P1 (see FIGS. 4A to 4D) to be received by a recipient. Thereafter, the paper printed document P1 is read in the second image processing device 40 by the recipient. Further, the recipient obtains the document information D1 (see FIGS. 4A to 4D) corresponding to the paper printed document P1. Here, in the document transmitting and receiving system 1 according to the third exemplary embodiment, the obtained document information D1 is automatically input to the first post-processing device 51 or the second post-processing device 52.

A basic configuration of the first post-processing device 51 and the second post-processing device 52 of the third exemplary embodiment is the same as the basic configuration of the post-processing device 50 of the first exemplary embodiment. However, in the third exemplary embodiment, different types of software for processing input data are respectively mounted in the first post-processing device 51 and the second post-processing device 52.

In the third exemplary embodiment, the first post-processing device 51 and the second post-processing device 52 are data-connected to the second image processing device 40 in parallel in the recipient side network system.

For example, software for processing a billing statement is mounted in the first post-processing device 51. Therefore, the first post-processing device 51 configures a system for processing a billing statement. In the meantime, for example, software for processing a contract document is mounted in the second post-processing device 52. Therefore, the second post-processing device 52 configures a system for processing a contract.

In the third exemplary embodiment, in the identification information image I2 (see FIGS. 4A to 4D) of the paper printed document P1, document type information (an example of type information) which is information on a document type is included. Examples of the document type include a billing statement or a contract document. Further, the document type information is registered by a sender when the sender transmits the document from the first image processing device 20 through the terminal device 10. The document type information is incorporated into the identification information image I2.

The management server 30 (an example of a creating unit) of the third exemplary embodiment creates document information D1 (see FIGS. 4A to 4D) in at least one data format among plural data formats. In the example of the third exemplary embodiment, the management server 30 creates document information D1 in various types of data formats such as a data format used for specific software which handles the billing statement or a data format used for specific software which handles the contract document. The document information D1 in a predetermined data format is created by the management server 30, based on data format information which will be described below.

The management server 30 transmits the created document information D1 to the recipient side first post-processing device 51 or second post-processing device 52, based on transmission destination information which will be described below. In this case, the transmission destination information is obtained from the second image processing device 40.

The second image processing device 40 of the third exemplary embodiment determines the transmission destination of the document information D1 based on the document type information. In the third exemplary embodiment, the transmission destination of the document information D1 is determined in advance so as to correspond to the document type. For example, when the type of document is a billing statement, the second image processing device 40 determines the transmission destination of the document information D1 as the first post-processing device 51. Further, for example, when the type of document is a contract document, the second image processing device 40 determines the transmission destination of the document information D1 as the second post-processing device 52.

The second image processing device 40 creates the transmission destination information which designates the transmission destination of the document information D1.

The second image processing device 40 determines the data format of the document information D1 based on the document type information. In the third exemplary embodiment, data formats which are handled by the first post-processing device 51 and the second post-processing device 52 are different from each other. Therefore, in the third exemplary embodiment, the second image processing device 40 determines the data format depending on the transmission destination of the document information D1. For example, when the type of document is a billing statement, the second image processing device 40 determines the data format of the document information D1 as a data format handled by the first post-processing device 51. Further, for example, when the type of document is a contract document, the second image processing device 40 determines the data format of the document information D1 as a data format of the second post-processing device 52.

The second image processing device 40 creates data format information (an example of format information) which designates the data format of the document information D1.

As described above, the second image processing device 40 creates the transmission destination information and the data format information. Further, the second image processing device 40 connects the transmission destination information and the data format information with the read identification information image I2 to be transmitted to the management server 30.

The second image processing device 40 transmits a read-out image (so-called scanned image) of the paper printed document P1 to the determined transmission destination. Further, when the recipient makes a record such as signs or seals on the paper printed document P1, a read-out image to which the record by the recipient is reflected is transmitted to the transmission destination.

Figure 14:
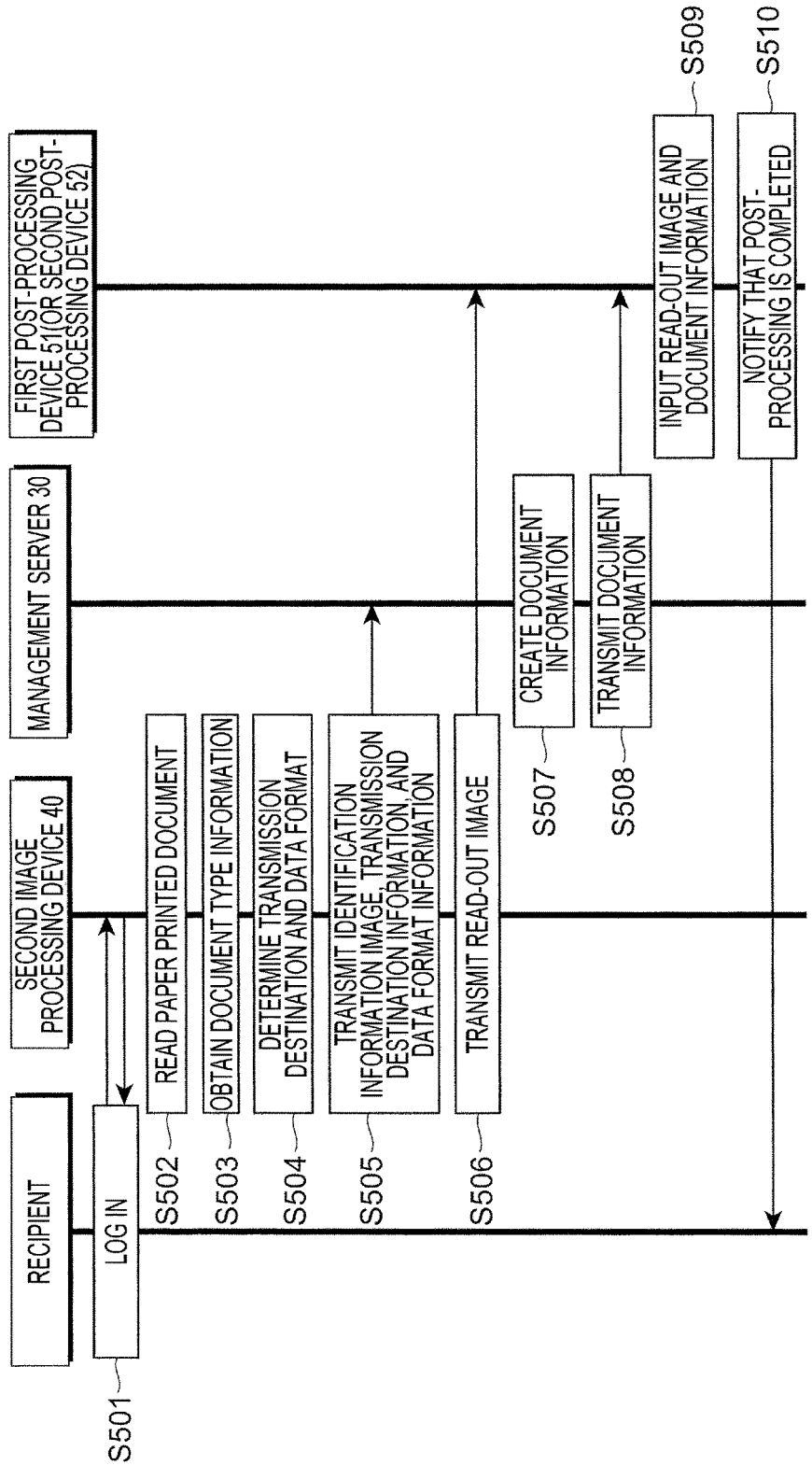
FIG. 14 is a sequence diagram when a recipient reads a paper printed document in the third exemplary embodiment.

FIG. 14 is a sequence diagram when a recipient reads the paper printed document P1 in a third exemplary embodiment.

As illustrated in FIG. 14, the recipient logs in the second image processing device 40 (S501).

The recipient reads the paper printed document P1 to the image reading unit 119 (see FIG. 3) of the second image processing device 40 (S502). Thereafter, the second image processing device 40 obtains document type information from the identification information image I2 (see FIGS. 4A to 4D) of the paper printed document P1 (see FIGS. 4A to 4D) (S503). The second image processing device 40 determines the transmission destination and the data format of the document information D1 (see FIGS. 4A to 4D) corresponding to the paper printed document P1 (S504).

Thereafter, the second image processing device 40 transmits the read-out image, the transmission destination information, and the data format information of the identification information image I2 read from the paper printed document P1 to the management server 30 (S505). Further, the second image processing device 40 transmits the image read from the paper printed document P1 to the determined transmission destination (the first post-processing device 51 or the second post-processing device 52) (S506).

Thereafter, the management server 30 searches for the document information D1 corresponding to the identification information image I2. Further, the management server 30 creates the document information D1 in a data format according to the obtained data format information (S507). Further, the management server 30 transmits the created document information D1 to the transmission destination (the first post-processing device 51 or second post-processing device 52), based on the obtained transmission destination information (S508).

The read-out image and the document information D1 of the paper printed document P1 are input to the first post-processing device 51 (or the second post-processing device 52) according to a predetermined processing (S509). Further, in the third exemplary embodiment, when the document information D1 is obtained, the first post-processing device (or the second post-processing device 52) transmits notification indicating that the document information D1 is obtained to the terminal device 10 which is used by the recipient or the second image processing device 40 (recipient) (S510).

In the third exemplary embodiment, the management server 30 directly transmits the document information D1 to the first post-processing device 51 or the second post-processing device 52. It should be noted that the present invention is not limited thereto. For example, the management server 30 may transmit the document information D1 to the second image processing device 40. Then, the second image processing device 40 may transmit the document information D1 to the determined transmission destination. In this case, the second image processing device 40 may not transmit the transmission destination information to the management server 30.

Similarly to the second exemplary embodiment, the example described in the third exemplary embodiment may also be applied when the sender prints the paper printed document P1 by the first image processing device 20 to send the paper printed document P1 to the recipient by mail.

In the third exemplary embodiment, the management server 30 creates the document information D1 in a predetermined data format. It should be noted that the present invention is not limited thereto. For example, after the second image processing device 40 obtains the document information D1, the second image processing device 40 may convert the data format of the document information D1 and send the converted document information D1 to the first post-processing device 51 or the second post-processing device 52.

In the third exemplary embodiment, different data formats are handled by the first post-processing device 51 and the second post-processing device 52 which are transmission destinations of the document information D1. It should be noted that the present invention is not limited thereto. For example, like a case when plural different types of software are mounted in the first post-processing device 51, devices of the same transmission destination may handle plural different data formats. In this case, document information D1 in different data formats may be transmitted to the device of the same transmission destination.

The third exemplary embodiment is not necessarily limited to transmitting document information D1 in a single data format corresponding to one paper printed document P1. For example, document information D1 in plural different data formats corresponding to one paper printed document P1 may be transmitted to the transmission destination.

In the third exemplary embodiment, an example in which the document type information is incorporated into the identification information image I2 is used. It should be noted that the present invention is not limited thereto. For example, when the second image processing device 40 reads the paper printed document P1, the second image processing device 40 may be configured to determine the type of document based on the contents of the read-out image.

Designation of the transmission destination of the document information D1 or designation of the data format of the document information D1 may be received by the input of the user. In this case, the transmission destination information is created based on the designation of the transmission destination by the user. Further, the data format information is created based on the designation of the data format by the user. The management server 30 automatically transmits the document information D1 in a predetermined data format to the transmission destination based on the created transmission destination information and data format information.

In the meantime, in the exemplary embodiment, a program for enabling a computer to implement a function of each configuration may be provided, for example, by a communication unit or may be provided by being stored in various recording media.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
    a first device comprising:
        a storage unit that stores (i) specifying information which uniquely specifies a document including a data part and (ii) the data part in association with each other, wherein the document comprises a document image, the data part comprises information contained in the document image, and the specifying information is a unique identifier of the document that identifies the document as an original document; and
        a transmitting unit that transmits the data part corresponding to the specifying information to a document recipient in response to obtained specifying information; and
    a second device communicatively coupled to the first device, the second device comprising:
        an obtaining unit that obtains the specifying information of the document from a document recipient; and
        a printing unit that prints the document including the data part and the specifying information,
        wherein when the printing unit prints a first instance of the document, identification of the document as the original document is made, but when a subsequent printing of the document is performed, identification of the document as the original document is not made, and the specifying information is not transmitted to the second device.

2. The system according to claim 1, wherein the transmitting unit limits transmitting the data part based on history information relating to the transmission of the data part.

3. The system according to claim 1, wherein the specifying information is provided at a predetermined page of the document.

4. The system according to claim 1, further comprising:
    a post-processing device that receives the data part transmitted by the transmitting unit and performs a predetermined processing using the data part.

5. The system according to claim 4, further comprising:
    a creating unit that obtains format information relating to a data format handled by the post-processing device and creates the data part in a predetermined data format based on the format information.

6. The system according to claim 4, wherein the obtaining unit obtains type information relating to a type of the document from the printed document and causes the post-processing device corresponding to the type information to receive the data part.

7. The system according to claim 1, further comprising:
    another printing unit that is separately provided from the printing unit and performs printing, wherein
    the other printing unit sends the document to the printing unit, and
    the printing unit receives the data part from the transmitting unit based on the specifying information of the printed document.

8. A processing device comprising:
    an image processing unit that processes document image including a data part, wherein the data part comprises information contained in the document image;
    an obtaining unit that obtains specifying information which uniquely specifies a document from the document image including the data part, wherein the specifying information is a unique identifier of the document that identifies the document as an original document;
    a receiving unit that receives the data part of the document associated with the specifying information; and
    a printing unit that prints the document including the data part and the specifying information,
    wherein when the printing unit prints a first instance of the document, identification of the document as the original document is made, but when a subsequent printing of the document is performed, identification of the document as the original document is not made, and the specifying information is not transmitted to the second device.

9. A non-transitory computer readable storage medium storing a program that causes a computer to perform processing comprising:
    obtaining specifying information which uniquely specifies a document from a document image including a data part, wherein the data part comprises information contained in the document image, and the specifying information is a unique identifier of the document that identifies the document as an original document;
    receiving the data part of the document associated with the specifying information; and
    printing the document including the data part and the specifying information,
    wherein when a first instance of printing the document is performed, identification of the document as the original document is made, but when a subsequent printing of the document is performed, identification of the document as the original document is not made, and the specifying information is not transmitted to a device for printing the document.

* * * * *